(12) United States Patent
Robinson et al.

(10) Patent No.: US 6,295,374 B1
(45) Date of Patent: *Sep. 25, 2001

(54) METHOD AND SYSTEM FOR DETECTING A FLAW IN A SAMPLE IMAGE

(75) Inventors: David A. Robinson, Northants; Anthony R. Bland, Sharnbrook, both of (GB)

(73) Assignee: Integral Vision, Inc., Farmington Hills, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/056,049

(22) Filed: Apr. 6, 1998

(51) Int. Cl.[7] ..................................................... G06K 9/68
(52) U.S. Cl. .......................... 382/218; 382/149; 382/209; 348/95; 358/504
(58) Field of Search ................................. 382/141–152, 382/167, 162, 209–294, 223; 702/35; 348/86–95, 125–134; 700/124; 101/181; 358/504, 518

(56) References Cited

U.S. PATENT DOCUMENTS

| | | | |
|---|---|---|---|
| 4,200,861 | 4/1980 | Hubach et al. | 382/216 |
| 4,481,664 | 11/1984 | Linger et al. | 382/149 |
| 4,887,530 | 12/1989 | Sainio | 101/181 |
| 5,146,509 | * 9/1992 | Hara et al. | 382/149 |
| 5,412,577 | 5/1995 | Sainio et al. | 700/124 |
| 5,544,256 | 8/1996 | Brecher et al. | 382/149 |
| 5,548,326 | * 8/1996 | Michael | 348/87 |
| 5,586,058 | 12/1996 | Aloni et al. | 702/35 |
| 5,640,200 | 6/1997 | Michael | 348/87 |
| 5,751,450 | * 5/1998 | Robinson | 358/504 |
| 5,764,386 | * 6/1998 | Robinson | 358/504 |
| 5,850,466 | * 12/1998 | Schott | 382/141 |
| 5,969,753 | * 4/1999 | Robinson | 348/130 |
| 5,987,159 | * 11/1999 | Nichani | 382/141 |

* cited by examiner

Primary Examiner—Leo Boudreau
Assistant Examiner—Ishrat Sherali
(74) Attorney, Agent, or Firm—Brooks & Kushman P.C.

(57) ABSTRACT

A method and system are described for use at a machine vision station to correctly identify flaws within a sample image by means of flexible template image comparison where the template image and a sample image suffer from a relative geometrical distortion. The method and system use the following iterative approach: 1) generate the template image; 2) register the sample image to the template image; 3) undertake an absolute image subtraction process; 4) identify all regions of image difference; 5) create sub-images of both the template and the sample images in the region of detected error; 6) repeat the registration step 2) using the sub-images; 7) undertake the absolute subtraction process on each of the sub-images; and 8) either identify the resulting differences as flaws or go to step 5) using even smaller sub-images. The invention has particular utility in the screen printing industry as well as other industries.

14 Claims, 4 Drawing Sheets

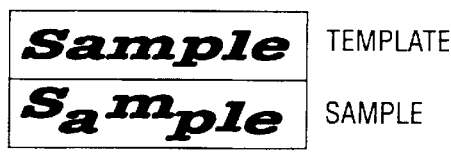
TEMPLATE
SAMPLE
Fig. 1
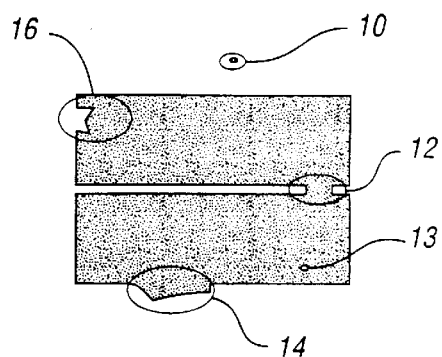
Fig. 2
Fig. 3
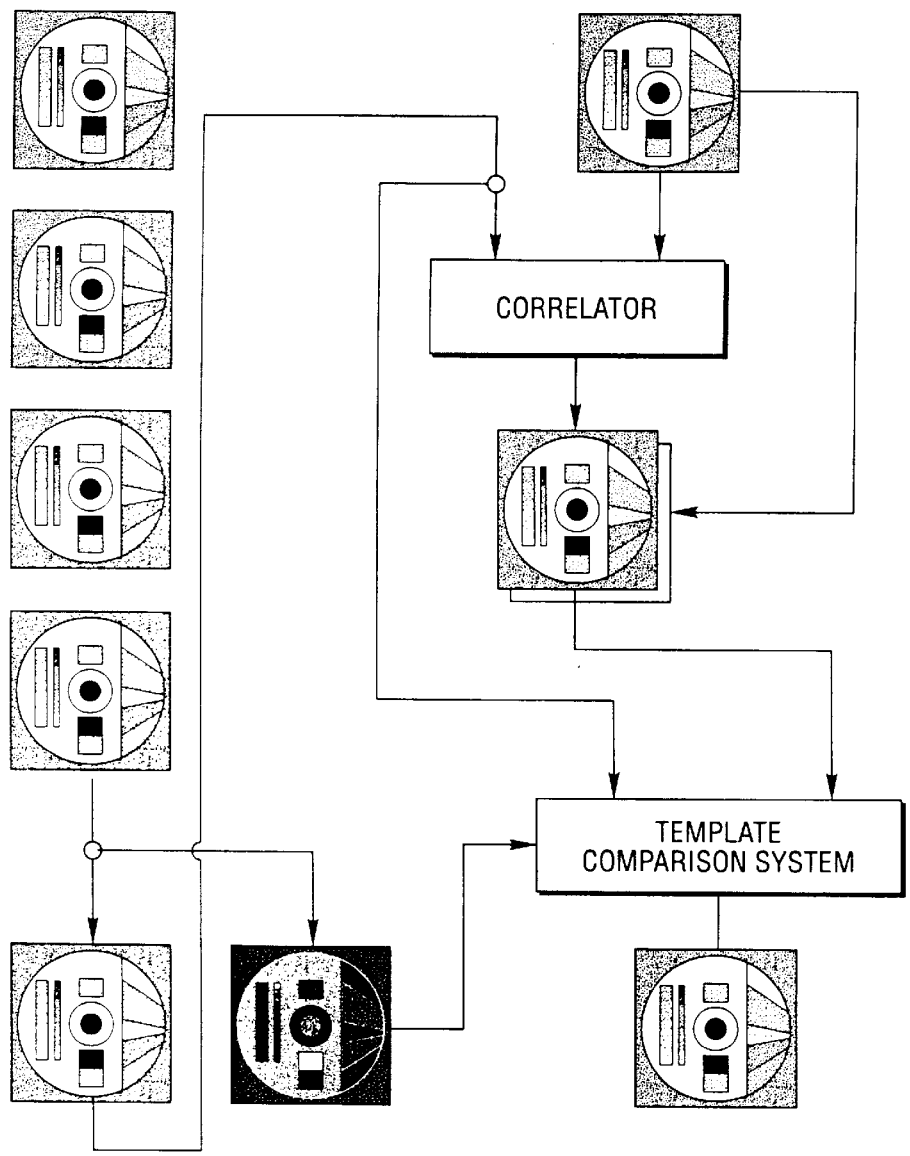

METHOD AND SYSTEM FOR DETECTING A FLAW IN A SAMPLE IMAGE

TECHNICAL FIELD

This invention relates to methods and systems for detecting a flaw in a sample image and, in particular, to interactive methods and systems for detecting a flaw in a sample image.

BACKGROUND ART

Relative geometric distortion is typically caused by differential stretching and twisting of screens of a screen printer being used to print an image. For purposes of this application, a flaw consists of an area of the image consisting of the wrong grey level, which cannot be accounted for by means of the relative geometrical distortion. A much exaggerated demonstration of such a distortion is shown in the image of FIG. 1.

Referring now to FIG. 2, the type of flaws that need to be detected include a pigment splash 10, a pigment bridge 12, a pinhole 13, a pigment overrun 14, and a missing pigment.

Techniques which are able to detect flaws such as those described above have been known for a considerable period of time. However, these techniques, such as those described in U.S. Pat. No. 5,640,200 entitled "Golden Template Comparison Using Efficient Image Registration" are only capable of working where there is an effectively constant geometric relationship existing between the template image and the sample image.

Referring now to FIG. 3, one technique of the above-noted patent initially creates a composite template image by statistically combining multiple instances of a "perfect" image. The resulting template consists of a mean image, together with a standard deviation image (i.e. $\sigma$ image). Naturally, the areas of most "rapid" rate of change within the template components (i.e. edges and regions of color change) provide most of the contribution to the standard deviation image, which can be used to form a mask of regions which, even on a good sample, are subject to the greatest variation, and, on hunting for flaws, can be given much less weight than areas that are subject to little change.

Once the template image has been fully trained, sample images taken from the production line can be compared with it. However, there is very little chance of the template and sample image exactly overlaying. In order to remove this misalignment some form of registration must be undertaken. This process invariably uses some form of correlation between either known landmarks or fiducial marks on both template and sample images, else using the complete image itself. Done properly, this process can provide a sub-pixel accurate measurement of the relative positioning of the template and the sample. This information can be used to either digitally re-register the images, or else can be used to re-position the sample image relative to the camera to ensure that the two images are optimally aligned. Flaws between the template image and the sample image can then be detected by the simple process of undertaking an absolute subtraction of the two. Thus, any difference, irrespective of whether the greyscale is brighter or darker than the other, results in a positive difference.

The value of this difference can either be thresholded, or else compared to the standard deviation image. Comparing with the $\sigma$ image allows one to determine if the difference in that region of the image is greater than that expected from the distribution derived from the template samples. If so, the pixel is marked as a flaw, or else it is considered as part of the natural statistical variation between acceptable samples. The resulting flaw flag can be directly used to provide an error image, which, after further analysis using morphological tools such as blob analysis, high-lights the position of any artifacts.

The system of the above-noted patent works well in many applications, and is used extensively within the machine vision industry. However, there are some very important applications where the assumption of optimum alignment between the template image and the sample image being satisfied by a single correlation process is not valid.

For example, there are many cases within the screen printing industry, where the printing screen can become warped during use and thus change the relative alignment between the template and sample images across the image. In the case where this alignment drift can itself be categorized as a flaw, the previously described methodology can still be used. However, in the case where the results of the geometric warp are considered unimportant, the flaws maintain their criticality. In this situation, the current prior art systems produce far too many rejects, which often increase as the production batches progress.

The U.S. Pat. No. 5,412,577 to Sainio et al. entitled "Color Registration System for a Printing Press" discloses a control system for controlling misregistration between the colors of an image printed on a web. The system includes an imaging device such as a camera, a processor and image conversion circuits coupled to the processor. In the preferred embodiment, four printing units each print one color of the image upon the web. This kind of printing is commonly referred to as web offset printing. Colors on the units are cyan (C), magenta (M), yellow (Y) and black (K) The system further includes a print controller, a computer, a camera positioning unit, a camera assembly, and a printing plate scanner. The controller converts the signals from the computer into signals having suitable quality. The assembly is configured to scan a web for red (R), green (G), blue (B) and infrared (I). The U.S. Pat. No. 4,887,530 also to Sainio describes a web registration control system.

SUMMARY OF THE INVENTION

An object of the present invention is to provide a method and system for detecting a flaw in a sample image of an object which cope with geometric warpage or distortion while at the same time maintain their sensitivity to the flaw.

In carrying out the above object and other objects of the present invention, a method is provided for detecting a flaw in a sample image of an object in a machine vision system including a camera and a computer. The method includes the steps of: a) creating a template image of the object; b) registering the template image and the sample image; and c) subtracting the template image from the sample image to provide an error image after performing step b). The method also includes the steps of: d) analyzing the error image to identify a region of error; e) creating a final image of both the template image and the sample image in the region of error; and f) repeating steps b) through d) using the final sub-images to obtain a final region of error. The method finally includes the step of: g) identifying the final region of error as the flaw.

The flaw is typically an area of the sample image which has an incorrect greyscale level.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a view of a template image and a corresponding sample image illustrating exaggerated relative geometric distortions;

FIG. 2 is a view of an image which illustrates a number of flaws that need to be detected;

FIG. 3 is a schematic block diagram flow chart illustrating a prior art system for detecting flaws in sample images;

BEST MODE FOR CARRYING OUT THE INVENTION

The method and system of the present invention are primarily used as an aid for the screen printing industry. However, the method and system of the present invention can also be used in other industries wherein a template image and a sample image suffer from a relative geometrical distortion.

Figure 4:
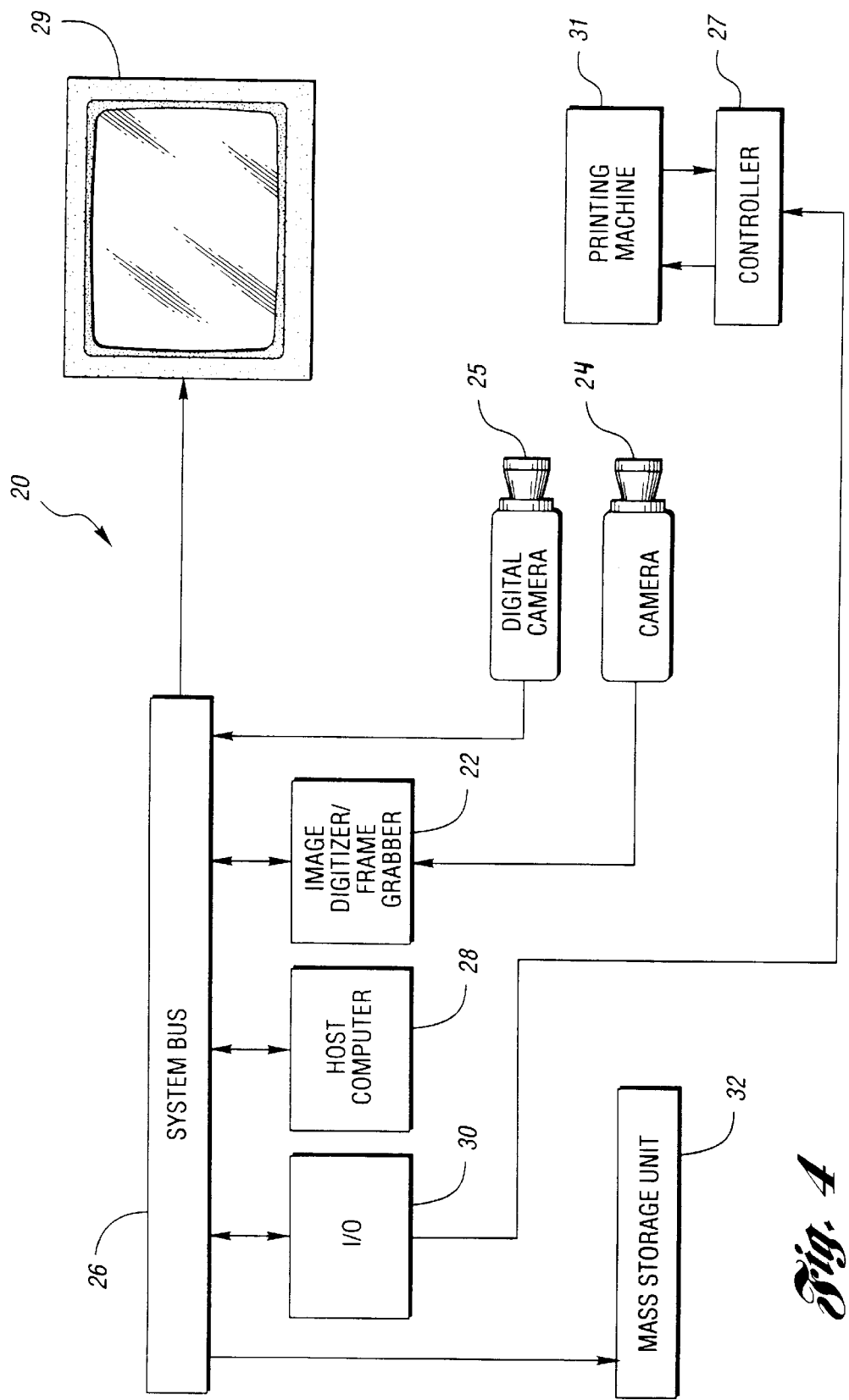
FIG. 4 is a schematic diagram illustrating a machine vision system and station at which the method and system of the present invention can automatically detect a flaw in a sample image.

Referring again to the drawings Figures, there is illustrated schematically in FIG. 4 a machine vision system and station, generally indicated at 20, by which the method and system of the present invention can automatically detect flaws in a sample image of an object. In general, a flaw is an area of the sample image having an incorrect greyscale level.

The machine vision system 20 typically includes an image digitizer/frame grabber 22. The image digitizer/frame grabber 22 samples and digitizes input images from an image source such as a camera 24 and places each input image into a frame buffer having picture elements. Each of the picture elements may consist of an 8-bit number representing the brightness of that spot in the image. A digital camera 25 may be provided to eliminate the need for the image digitizer/frame grabber 22.

The system 20 also includes input/output circuits 30 to allow the system 20 to communicate with external devices such as a controller 27 for controlling a screen printing machine 31.

The camera 24 may be an image source such as an analog, digital, or line scan camera such as RS-170, CCIR, NTSC and PAL.

A system bus 26 may be either a PCI, an EISA, ISA or VL system bus or any other standard bus to allow inter-system communication such as at a monitor 29 of the system 20.

The image digitizer/frame grabber 22 may be a conventional frame grabber board such as that manufactured by Matrox, Cognex, Data Translation or other frame grabbers. Alternatively, the image digitizer/frame grabber 22 may comprise a vision processor board such as made by Cognex.

The machine vision system 20 may be programmed at a mass storage unit 32 to include custom controls for image processing and image analysis. Examples of image processing may include linear and non-linear enhancement, morphology, color and image arithmetic. Also, image analysis may include search, edge, caliper, blob, template, color, 2-D and 3-D measurements.

A computer 28 of the system 20 may be a Pentium-based IBM compatible PC or other PC having a sufficient amount of RAM and hard disk space for performing the algorithms associated with the present invention.

Figure 5:
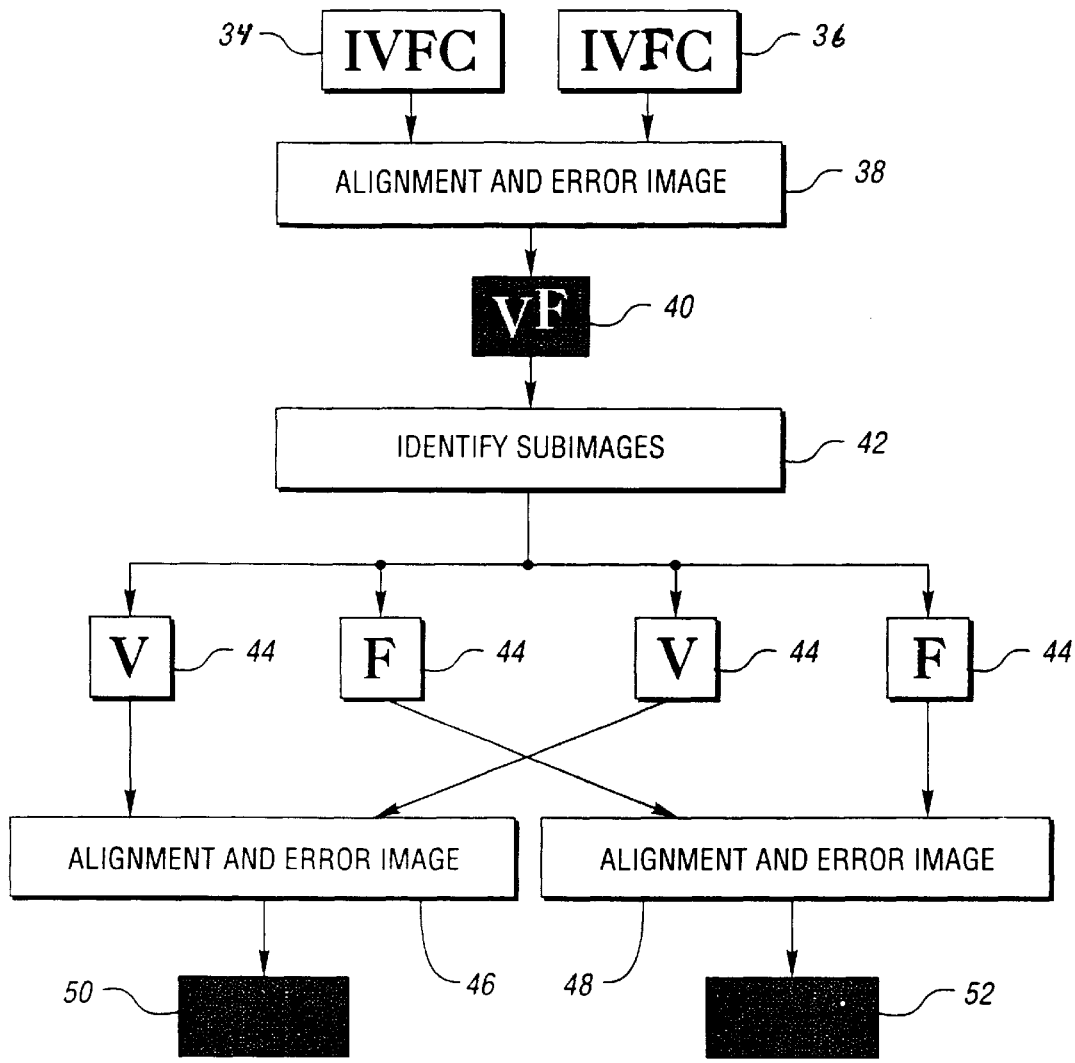
FIG. 5 is a schematic block diagram flow chart illustrating the method and system of the present invention.

Referring now to FIG. 5, there is illustrated a template image 34 in the form of a 4 letter sequence "IVFC". A sample image 36 has the same sequence except that the "V" and the "F" is slightly out of position due to screen distortion, and "F" has a real flaw in the form of a small "mouse nibble" near the top of the left hand side of the vertical.

These images 34 and 36 are fed into the Alignment and Error Image processing stage 38. This undertakes the correlation between the complete template image 34 and the sample image 36, and, based upon this, their relative positions are adjusted and an absolute value substraction is undertaken between the repositioned sample and template images. The resulting error image 40 consists of part of the "V" and "F" corresponding to the regions where they are still out of alignment. This error would be incorrectly classified as a flaw by the prior art systems.

This error image 40 is passed into a identify sub-images process 42, which identifies the respective regions that are still out of register. It then forms independent sub-images 44 of these regions (i.e. the "F" and the "V" from both the template and sample images).

These sub-images 44 are now passed through an alignment and error image generator 46 which now re-registers the template "V" with the sample "V" which, because it contains no flaws, returns a completely blank error image 50. The process is repeated in a second alignment and error image generator 48 with the "F" which produces an error image 52 which clearly shows the "mouse nibble" but very little else.

Figure 8:
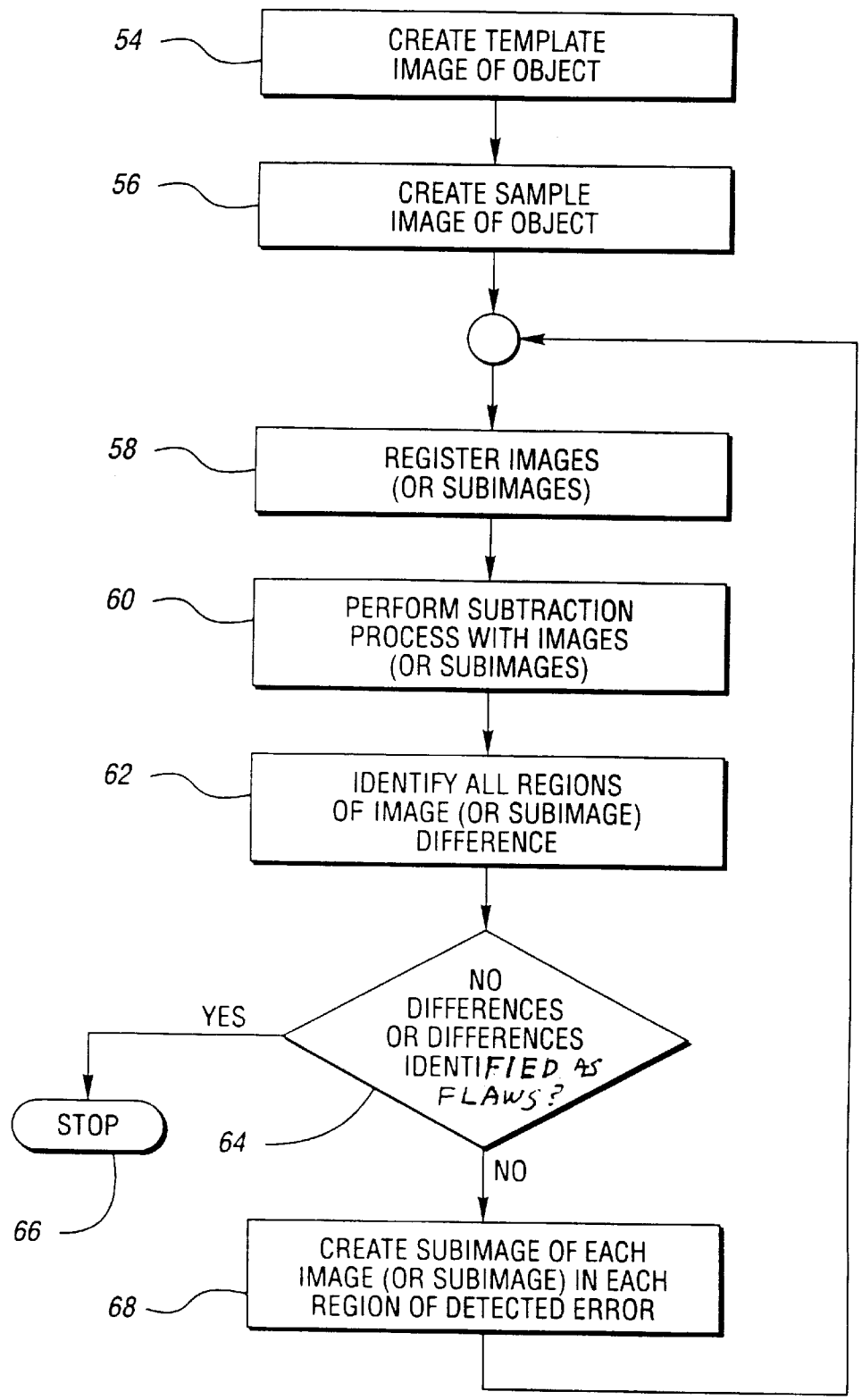
FIG. 8 is a block diagram flow chart illustrating the method of the present invention.

Referring now to FIG. 8, there is illustrated in block diagram form the method of the present invention.

At block 54, a template image of an object is created.

At block 56, a sample image of the object is created.

At block 58, the images are registered if this is the first pass through the methodology of FIG. 8. If this is a second or subsequent pass through the methodology of FIG. 8, then the resulting sub-images are registered as will be described in greater detail hereinbelow.

At block 60, a subtraction process is performed with the images created at blocks 54 and 56.

At block 62, all regions of image difference are identified.

At block 64, if no differences are found or if differences are identified as flaws, block 66 is entered and the methodology is stopped.

If at block 64 the differences are not identified as flaws, the method enters block 68 wherein sub-images are created for each image in each region of detected error.

At this point, block 58 is re-entered and the sub-images created at block 68 are registered and the steps of the remaining blocks 60, 62 and 64 are performed with the sub-images.

If at block 64 the differences are still not identified as flaws, block 68 is re-entered and sub-images of each sub-image in each region of detected error are created and block 58 is then re-entered wherein the sub-images of the sub-images are registered and thereafter blocks 60, 62 and 64 are re-entered.

Correlation Considerations

It can be readily appreciated that during each step through the above iterative process, the size of the sub-images gets smaller but their number can increase substantially. Consequently, the actual correlation process will represent a critical component to the throughput of the system. It is therefore important that the efficiency of this computation is kept as high as is possible.

It is well known that in general signal processing applications, pattern matching can be achieved using the well known techniques of correlation. In its simplest form this involves calculating the correlation integral for all relative displacements of the template inside the image to be searched. Assuming that the means of the template and the sub-image under the template are zero, the correlation integral can be expressed as:

$$Z(x,y) = \int\int I_{x+a,y+b} T_{a,b} \, da \, db$$

where x and y specify the position of the template T inside the image to be searched. I, a and b are variables of integration and have a range which covers the complete area of the template. To see what the correlation integral is doing, one considers the n-pixel template image to be a point in n-dimensional space.

Figure 6:
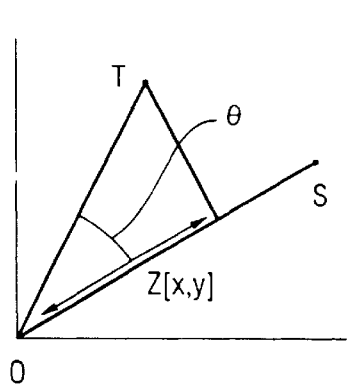
FIG. 6 is a graph illustrating a scalar product of a template image's position vector with that of a sub-image under the template of the image.

For example, 65536 dimensional space is capable of representing all possible 256×256 greyscale images. The correlation integral can then be seen to be nothing more than the scalar product of the template image's position vector with that of the sub-image under the template of the image to be searched. This is illustrated for a two-dimensional case in FIG. 6.

The basic correlation theory states that the position of the optimum match occurs when Z(x,y) takes its maximum value.

In practice, this simple theory is not adequate. It is possible for a very bright patch of the image to be searched to have a higher scalar product with the template image than the correct area. To get around this, the correlation theory is modified, to use "normalized correlation". In effect, normalized correlation reduces each of the position vectors in n-dimensional space to unit length. In this form, one can see that the "normalized correlation coefficient" is nothing more than the cosine of the angle between the position vectors of the images.

From basic vector algebra:

$$OS.OT = |OS||OT| \cos(\theta)$$

where:

$$OS.OT = \int\int OS_{x+a,y+b} OT_{a,b} \, da \, db,$$

$$|OS|^2 = \int\int OS^2_{x+a,y+b} \, da \, db,$$

$$|OT|^2 = \int\int OT^2_{a,b} \, da \, db,$$

$$\zeta(x,y) = \frac{\int\int OS_{x+a,y+b} OT_{a,b} \, da \, db}{\sqrt{\int\int OS^2_{x+a,y+b} \, da \, db \int\int OT^2_{a,b} \, da \, db}} = \cos(\theta)$$

This relationship fully explains the +1→−1 range of the normalized correlation coefficient.

The correlation approach to pattern matching has many drawbacks when one implements it in software. Perhaps the most serious of which is the dynamic range of the variables which one has to use to store intermediate results. The above equation contains a large number of products of pixel values, this increases the required dynamic range very rapidly. Multiplying two 8-bit pixels immediately takes one to a 16-bit result, summing over many such results requires, minimally, 32 bits of storage. The square root and division, to yield a result between −1 and 1 necessitates the use of floating point arithmetic, together with the corresponding performance penalty. The technique works and works well. However, in the iterative environment one is working in, the time taken to apply this implementation would render the system unusable.

Figure 7:
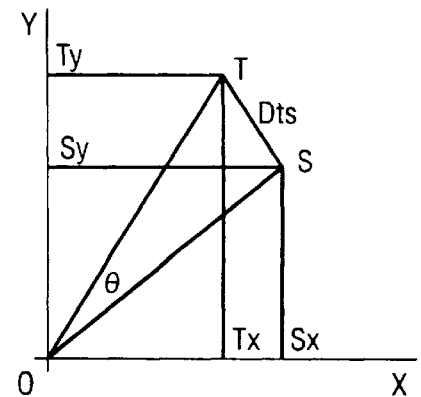
FIG. 7 is a graph illustrating various vector relationships of a template image in vector form and a sample image in vector form.

However, staying with the simplified two-dimensional case, one can see the following vector relationships in FIG. 7. Here, OT represents the template image in vector form (for a realistic image this would exist in "N" dimensional space, where N is the number of pixels in the image). Similarly, OS represents the sample image in vector form. The line $D_{ts}$ represents the physical distance between the template and sample image and can be seen to be equal to:

$$D_{ts} = \sqrt{(Sx-Tx)^2 + (Sy-Ty)^2}$$

One can also obtain its value directly from the Cosine rule viz:

$$D_{ts}^2 = OT^2 + OS^2 - 2*OT*OS*\cos(\theta)$$

One also knows the following:

$$OT = \sqrt{TX^2 + Ty^2} \quad OS = \sqrt{Sx^2 + Sy^2}$$

From this analysis, one can see that computing the overall distance from the generalized equation:

$$D_{ts} = \sqrt{\Sigma_{pixels}(S_i - T_i)^2}$$

provides exactly the same information but in a different format to that of computing the normalized correlation integral, but in a substantially simpler form.

The validity of this analysis can be demonstrated in diagrams where a distance based pattern match is compared to a correlation based pattern match. One would not expect the two to produce identical results as the relationship between the distance and correlation image contain functions depending on the magnitude of the image vector length.

Both methods clearly and unambiguously indicate the position where the sample image most closely matches the template, where the images are darkest—or where the distance is smallest.

The formulation for distance is well known in the art and is called the Euclidean distance. However, it is rarely used where maximum performance is required due to the need to incorporate floating point arithmetic to compute the square root function. This operation is often replaced by a similar well known function called CityBlock distance. This is defined as:

$$D_{ts} = \Sigma_{pixels}|Si - Ti|$$

A comparison of the two algorithms for all practical purposes produce identical results without the need to apply floating point arithmetic.

This algorithm is well known in the art, and has merely been included to show that CityBlock distance is simply an approximation to the Euclidean distance measure which, in turn, is merely a very efficient way of undertaking text book normalized correlation.

Error Image Considerations

The error image is generated by forming the absolute subtraction of the template image and the sample image. Although the spatial resolution is limited to the pixel level of the camera 24, in general the alignment between the two images will not be constrained to be an integer number of pixels. Consequently, the error image will always contain the outline of the target made up from the fractional part of the misregistration. Although correlation is capable of determining alignment to sub-pixel accuracy, it requires some mechanism such as interpolation or curve fitting to be applied to the pixel quantized shifting operations undertaken to compute the cross correlation relationship.

Sub-image Identification Considerations

The resulting error image obtained after the re-registration phase requires the area's showing errors to be locally re-registered, and the process being repeated. Three methods of identifying these sub-images are possible, these are:

1. Manual pre-selection of sub-images;
2. Automatic pre-selection of sub-images;
3. Blind allocation of sub-images.

The first option allows the user to select "obvious" regions for use as sub-images. For example, in the first example image of the word "SAMPLE" in FIG. 1, each letter would be the natural choice for the sub-image selection.

As this decision could be made during train time, the setting up of these images wouldn't have direct impact on the performance of the system during system run time.

The second option is available when there is just too much data to make manual selection a practical option. There are many possible options for undertaking the automatic selection of the sub-images. For example, both Hough and frequency domain transform techniques make excellent choices when the pattern is on a regular grid. Cepstrum analysis has been used to identify the x and y positioning of the letters in the example text.

Finally, the automatic blind selection of the sub-image would be used where the shape of the regions were sufficiently complex to render either of the first two options inappropriate. In this mode of operation, the sub-image would be selected from the original error image. Regions of error image would be processed with a morphological "blob" tool which essentially collects adjacent flawed pixels into an amorphous region. An analysis would be made using the physical size of each blob as to whether it could be categorized directly into a small flaw such as a pigment splash, or a much larger blob which would probably be caused by an area of the two images not being in register, due to relative template/sample warpage.

A rectangular region would be generated that generously enclosed the offending blob and the coordinates of the corners of the region would be used as the coordinates of the sub-image to extract from the template and sample image. These two sub-images would then be re-registered, and the resulting error image used to determine whether another iteration is required.

While the best mode for carrying out the invention has been described in detail, those familiar with the art to which this invention relates will recognize various alternative designs and embodiments for practicing the invention as defined by the following claims.

What is claimed is:

1. A method for detecting a flaw in a sample image of an object in a machine vision system including a camera and a computer, the method comprising the steps of:

a) creating a template image of the object;

b) registering the template image and the sample image;

c) subtracting the template image from the sample image to provide an error image of the sample image after performing step b);

d) analyzing the error image to identify at least one region of error of the sample image;

e) creating an individual final sample sub-image of the sample image at each identified region of error;

f) creating an individual final template sub-image of the template image at each identified region of error of the sample image;

g) registering each individual final template sub-image and each corresponding individual final sample sub-image;

h) subtracting each final template sub-image from each corresponding final sample sub-image to provide a final error image for each final sample sub-image;

i) analyzing the final error image for each final sample sub-image to identify a final sample sub-image region of error for each final sample sub-image; and i) identifying each final sample sub-image region of error as the flaw.

2. The method as claimed in claim 1 wherein steps e) and f) are based on a preselection process.

3. The method as claimed in claim 2 wherein the preselection process is a manual preselection process.

4. The method as claimed in claim 2 wherein the preselection process is an automatic preselection process.

5. The method as claimed in claim 1 wherein steps e) and f) include the step of processing each identified region of error to create each final sub-image.

6. The method as claimed in claim 1 wherein steps e) and f) include the step of creating an initial sub-image of both the template image and the sample image in each identified region of error and wherein each final sub-image are sub-images of each initial sub-images.

7. A system for detecting a flaw in a sample image of an object at a vision station including a camera, the system comprising:

first means for creating a template image of the object;

second means for registering the template image and the sample image;

third means for subtracting the registered template image from the sample image to provide an error image of the sample image;

fourth means for analyzing the error image to identify at least one region of error of the sample image;

fifth means for creating an individual final sample sub-image and an individual template sub-image in each identified region of error, the second means registering each final sub-image of the template image and the sample image, the third means subtracting each final registered sub-image of the template image and the sample image to provide a final error image for each final sample sub-image and the fourth means analyzing each final error image of each final sample sub-image to identify a final sample sub-image region of error for each final sample sub-image; and sixth means for identifying each final sample sub-image region of error as the flaw.

8. The system of claim 7 wherein the fifth means creates the sub-images based on a preselection process.

9. The system of claim 8 wherein the preselection process is a manual preselection process.

10. The system as claimed in claim 8 wherein the preselection process is an automatic preselection process.

11. The system as claimed in claim 7 wherein the fifth means includes means for processing each identified region of error to create each final sub-images.

12. The system as claimed in claim 7 wherein the fifth means creates an initial sub-image of both the template image and the sample image in each identified region of error and wherein each final sub-images are sub-images of each initial sub-images.

13. A method for detecting a flaw in a sample image of a geometrically distortable object in a machine vision system including a camera and a computer, the method comprising the steps of:

a) presenting a geometrically distortable object for flaw detection;

b) creating a template image of the object wherein substantially no effectively constant geometric relationship exists between the template image and the sample image;

c) registering the template image and the sample image;

d) subtracting the template image from the sample image to provide an error image of the sample image after performing step c);

e) analyzing the error image to identify a region of error of the sample image;

f) creating a final sub-image of both the template image and the sample image in the identified region of error;

g) repeating steps c) through e) using the final sub-images to identify a final region of error; and h) identifying the identified final region of error as the flaw.

14. A system for detecting a flaw in a sample image of a geometrically distortable object at a vision station including a camera, the system comprising:

first means for creating a template image of the object wherein substantially no effectively constant geometric relationship exists between the template image and the sample image;

second means for registering the template image and the sample image;

third means for subtracting the registered template image from the sample image to provide an error image of the sample image;

fourth means for analyzing the error image to identify at least one region of error of the sample image;

fifth means for creating a final sub-image of both the template image and the sample image in the identified region of error, the second means registering the final sub-images of the template image and the sample image, the third means subtracting the final registered sub-image of the template image and the sample image to provide a final error image and the fourth means analyzing the final error image to identify a final region of error; and sixth means for identifying the final region of error as the flaw.

* * * * *